(12) United States Patent
Suttle et al.

(10) Patent No.: US 7,820,218 B2
(45) Date of Patent: Oct. 26, 2010

(54) METHODS AND APPARATUS FOR FORMING SHAPED EDIBLE PIECES

(75) Inventors: James M. Suttle, East Stroudsburg, PA (US); Thomas M. Collins, Nazareth, PA (US); George Graham, Hackettstown, NJ (US); Alfred V. Camporini, Hackettstown, NJ (US); Jennifer Tomasso, Flanders, NJ (US)

(73) Assignee: Mars, Incorporated, McLean, VA (US)

( * ) Notice: Subject to any disclaimer, the term of this patent is extended or adjusted under 35 U.S.C. 154(b) by 1148 days.

(21) Appl. No.: 11/353,553

(22) Filed: Feb. 13, 2006

(65) Prior Publication Data

US 2006/0210672 A1   Sep. 21, 2006

Related U.S. Application Data

(60) Provisional application No. 60/652,485, filed on Feb. 11, 2005.

(51) Int. Cl.
*A23P 1/00* (2006.01)

(52) U.S. Cl. .................. 426/515; 426/389; 426/414; 426/512

(58) Field of Classification Search .................. 426/515
See application file for complete search history.

(56) References Cited

U.S. PATENT DOCUMENTS

| | | | | |
|---|---|---|---|---|
| 3,860,057 | A * | 1/1975 | Garlick ...................... | 164/481 |
| 4,315,885 | A * | 2/1982 | Lemelson ................. | 264/297.6 |
| 5,073,379 | A * | 12/1991 | Klimesch et al. ............. | 424/467 |
| 6,302,677 | B1 * | 10/2001 | Suttle et al. .................. | 425/373 |
| 6,303,171 | B1 | 10/2001 | Van Dyck et al. ........... | 426/515 |
| 7,223,428 | B2 * | 5/2007 | Willcocks et al. ........... | 426/383 |
| 2002/0176918 | A1 * | 11/2002 | Willcocks et al. ........... | 426/512 |
| 2003/0175393 | A1 | 9/2003 | Barroche | |
| | | | Heinrich et al. ............. | 426/496 |
| 2004/0099153 | A1 * | 5/2004 | Refer et al. .................... | 99/452 |
| 2004/0170725 | A1 * | 9/2004 | Begleiter ..................... | 426/87 |

FOREIGN PATENT DOCUMENTS

| | | | |
|---|---|---|---|
| EP | 1378175 | A1 * | 7/2004 |
| EP | 1444901 | | 8/2004 |
| JP | 2002-04206 | * | 2/2002 |
| JP | 2003-169604 | | 6/2003 |
| WO | 98/47393 | | 10/1998 |

OTHER PUBLICATIONS

Striech; Striech's Candy Making and Mold Instructions; 6/162004).*
http://dictionary.reference.com/browse/belt; Feb. 16, 2010.*
21 C.F.R. Chapter I, Part 163 "Cacao Products" (2006).
Webster's Ninth New Collegiate Dictionary Merriam-Webster Inc. (1984).

* cited by examiner

*Primary Examiner*—Keith D Hendricks
*Assistant Examiner*—Patricia A George
(74) *Attorney, Agent, or Firm*—Fitzpatrick, Cella, Harper & Scinto

(57) ABSTRACT

A method for forming thin edible pieces uses two continuous belts that cooperate to form a fill cavity. An edible mass, such as chocolate, is flowed into the fill cavity where it forms an edible blank which is transported on a belt path with the two belts moving in tandem. After the edible blank is released from the first or second continuous belt, a three-dimensional shape may be imparted to the edible blank at a forming station using one or more stamping dies or a forming drum. Using the techniques and apparatus described herein, novel edible products, and particularly novel chocolate products, can be made having shape characteristics that cannot be obtained using known molding or forming techniques.

20 Claims, 4 Drawing Sheets

METHODS AND APPARATUS FOR FORMING SHAPED EDIBLE PIECES

This application claims the benefit of priority of U.S. Provisional Application No. 60/652,485, filed Feb. 11, 2006, which is incorporated by reference.

BACKGROUND OF THE INVENTION

1. Field of the Invention

The invention relates to methods of forming thin edible pieces, and in particular very thin edible pieces having novel contoured surfaces.

2. Description of the Related Art

The manufacture of thin edible pieces imposes significant technical constraints and challenges. Molding techniques and apparatus, such as those conventionally used for making molded chocolate products, place significant limitations on the product that may be obtained. For example, thin chocolate pieces cannot be molded using conventional techniques because demolding requires the mold to be turned over, and sometimes pounded, to release the solidified chocolate. Thin pieces lack the necessary weight relative to surface area to fall out of their own accord, and attempts to extract them from the mold would likely break them.

The constraints of mold design also limit the configuration of the molded products in other ways. Molded products are generally flat-backed, as the molded material must fill, and then sit in, the mold. Further, draft angles of the mold (also called release angles) must be at least about 7 degrees, preferably 8 to 10 degrees or greater to prevent pieces from becoming stuck in the mold. It is also very difficult to obtain a piece having sharp angles using conventional mold design, as air may be trapped in the recesses, making it difficult to remove the piece. See, e.g., P. Harbecke, *The Creation and Manufacture of a Chocolate Mould*, 39$^{th}$ P.M.C.A. Production Conference (1985).

Working by hand with chocolate (i.e., not in the context of making a manufactured confectionery product) chefs have been able to use the expedient of adding extenders, typically large amounts of corn syrup or other carbohydrate syrup, to allow the chocolate to be worked in a plastic state for a relatively long period of time before it sets. However, these items are intended for display, and are only rarely eaten, as the additives deleteriously effect the taste or texture of the chocolate product, which after initially attaining a fudge-like consistency quickly becomes dry and brittle.

Typically, as much as a third of the so-called 'modeling chocolate' is some type of corn or sugar syrup. Typically, SOI chocolates have a very low moisture content, usually below 1.0% by wt. This very low moisture is critical to the chocolate having the expected mouthfeel and flavor profile associated with pure chocolate products. With the introduction of such large amounts of syrups, the moisture contents are raised very significantly, perhaps to 10% or higher. The result is that the texture of the liquid chocolate becomes extremely viscous and fudge-like rather than fluid. Additionally, after the chocolate pieces age for a few days, the chocolate takes on a dry and brittle texture which is completely unsuitable for consumption as a normal chocolate product. Thus, there continues to be a need for techniques and apparatus for forming very thin chocolate products having complex shapes which are made out of pure chocolate without using extenders.

U.S. Pat. No. 6,303,171 B1 describes a method and device for producing thin pieces of chocolate having curved surfaces. The apparatus comprises a flexible forming belt on which slices of chocolate are deposited. The flexible belt is passed through a trough having narrower width than the belt, forcing the sides of the belt to bend upwards and imparting a simple curvature to the slice. The belt and slice are passed through a cooling tunnel in this position, to form solidified curved chocolate slices. A flexible, continuous, forming substrate, like the flexible belt described in U.S. Pat. No. 6,303,171 B1, can hold only a limited number of stable forming positions while it is conveyed through the cooling tunnel. Consequently, the surface contours of the pieces that can be manufactured with that apparatus are limited as a practical matter to simple bends.

Thus, there continues to be a need in the art for processes and apparatus which can be used to form very thin edible pieces, and for methods of forming thin edible pieces into contoured designs. There is a particular need for such processes and apparatus that can be used to manufacture and impart contour to very thin chocolate pieces, even using Standard of Identity chocolate that has not been adulterated with extenders.

SUMMARY OF THE INVENTION

In one aspect, the invention is an apparatus for forming an edible piece, comprising a first continuous belt moving on a belt path and having at least one cutout in a cross-sectional surface thereof and a second continuous belt having at least a first portion positioned below the first continuous belt and in an engaging relationship with the cross-sectional surface of the first continuous belt at a first position on the belt path. The first and second continuous belts together define a fill cavity having walls defined by the profile of the cutout. A depositor is adapted to deposit an edible mass in the fill cavity, and a control unit registers the movement of the first and second belt so that the edible mass in the fill cavity moves to a second position where the first and second continuous belts separate from each other.

In another aspect, the invention is a method of forming contoured edible pieces (hereinafter, a "belt forming method") comprising the steps of:

(a) providing a first continuous belt moving on a belt path and having at least one cutout in a cross-sectional surface thereof and a second continuous belt having a portion positioned below the cross-sectional surface of the first continuous belt in an engaging relationship therewith at a first position on the belt path so as to form a bottom portion of the at least one cutout and create a fill cavity having walls defined by the cutout; (b) adding an edible mass to the fill cavity to form an edible blank; (c) transporting the fill cavity and the edible blank to a second position on the belt path; (d) cooling the edible blank so that it at least partially sets; (e) separating the first continuous belt from the second continuous belt at the second position on the belt path; and (f) releasing the contoured edible blank from the first or second belt.

In still another aspect, the invention constitutes methods and apparatus for forming contoured edible pieces, hereinafter the "forming methods" and "forming apparatus" respectively. The forming methods and apparatus may be combined with the belt forming methods and apparatus, or they may be practiced independently.

A general method of forming contoured edible pieces according to the invention comprises the steps of: conveying an edible blank on a conveyor belt; conditioning the edible blank, contacting the conditioned edible blank with a rigid member having a contoured forming surface to form a contoured edible piece; removing the contoured edible piece from the forming surface, and stabilizing the contoured edible piece.

In the most preferred embodiments, the contoured edible pieces are chocolate. In this context, conditioning refers to the degree of solidification of the edible mass. A conditioned edible blank is one in which a phase change or change in viscosity has been induced to put the edible blank in a malleable state. In the context of chocolate pieces, stabilizing refers to a process to increase the degree of crystallization of the edible piece to a point where the edible piece has stable crystal polymorphs.

In embodiments, the general method for forming contoured edible pieces is practiced with a rotating forming drum as the rigid member (hereinafter, a "roll forming method"). The conditioned edible blank is held against the drum by a backing belt as the drum rotates. The backing belt may be the same belt used to convey edible pieces in the processes described above for forming thin edible blanks, i.e., the second continuous belt.

In other embodiments, the general method for forming contoured edible pieces is practiced by transferring a conditioned edible blank to a first die, followed by pressing the blank between the first die and a second die to impart contour. The forming step imparts the desired contour to the blank without changing its thickness.

The corresponding apparatus for forming contoured edible pieces comprises a continuous conveyor belt adapted to convey conditioned edible blanks along a belt path, the blank having a bottom surface in contact with the conveyor belt and a top surface opposite the bottom surface. The apparatus is provided with a temperature controller adapted to control a temperature to which the conditioned edible blank is exposed on at least a portion of the belt path (if necessary, to condition or maintain the conditioning of the edible blank); a rigid member having a contoured forming surface adapted to support a surface of the conditioned edible blank removed from the conveyor belt; a pressing member contacting a surface of the blank opposite the surface contacted by the rigid member, to press the conditioned edible blank against the rigid member and impart contour to the blank and form a contoured edible piece; and a transfer member adapted to remove the contoured edible piece supported on the rigid forming surface.

In one embodiment of the apparatus (hereinafter, a "roll forming apparatus") the rigid member is a rotating forming drum contacting the top surface of the conditioned edible blank while the bottom surface contacts the conveyor belt; and the conveyor belt is the pressing member, which presses the conditioned edible blank against the surface of the forming drum held by a backing roller as the forming drum rotates. The forming drum has conduits circulating coolant to and from the drum to control the temperature of the forming surface. The temperature of the forming surface is controlled to improve the release characteristics so that the contoured edible piece can be removed from the forming surface.

Alternatively, the conditioned edible blank is transferred from the conveyor belt to at least one first rigid die and the contoured edible piece is formed by pressing the edible blank between the first die and a second rigid die at a forming station. Preferably, a plurality of dies is used. The dies are transported on a die transport path from the conveyor belt, where the blank is positioned on the first die, to a forming station.

Products according to the invention are very thin chocolate products characterized by (a) having a thickness dimension of less than about 2.0 mm; (b) having a substantially uniform thickness over the entire area of the product; (c) having a smooth and unbroken surface finish; (d) having at least one curve along at least one axis of curvature; and (e) having a moisture content of less than 2.0 percent.

Preferably the moisture content is less than 1.5 percent, more preferably less than 1.2 percent, still more preferably less than 1.0 percent and most preferably less than 0.8 percent. As noted above, these ranges are generally consistent with SOI chocolate, and in any event differ from the moisture content that would be found in a chocolate that had been adulterated to permit shaping.

Preferred products according to the invention may be distinguished from shell molded pieces by the absence of draft angles.

DETAILED DESCRIPTION OF THE INVENTION

Figure 1:
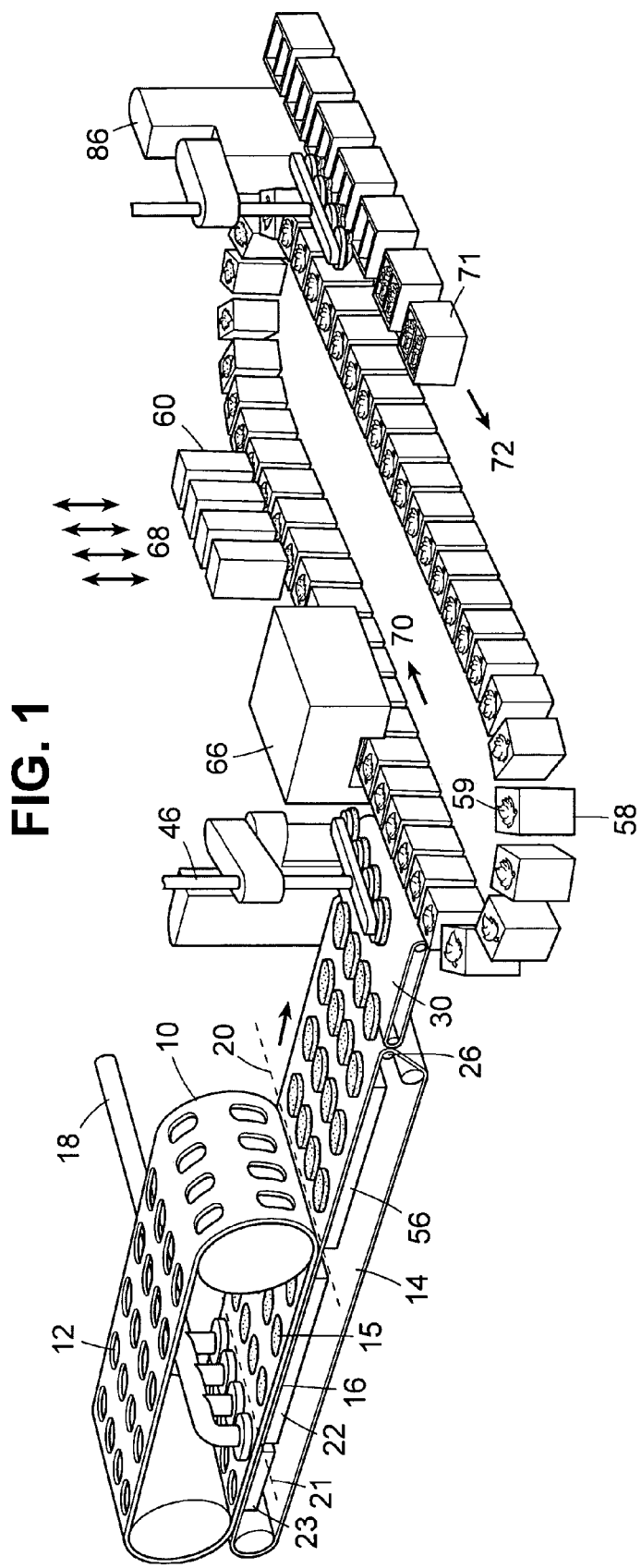
FIG. 1 is a view of a belt forming apparatus according to the invention, including a die stamping forming station.

The invention is directed to manufacture of thin and in particular very thin edible pieces. "Thin" is defined as having a thickness of about 2.00 mm to about 4.00 mm. "Very thin" is defined as having a thickness in a range of about 1.0 mm up to about 2.00 mm. "Ultra thin" is defined as having a thickness less than about 1.0 mm. The edible pieces manufactured with the methods and apparatus described herein preferably have a substantially uniform very thin thickness. Preferably the thickness is in a range of 1.00 mm to 2.00 mm. More preferably, the thickness is in a range of 1.00 mm to 1.50 mm. Still more preferably, the thickness is in a range of about 1.00 mm to 1.25 mm. Most preferably, the thickness is in a range of about 1.00 mm to about 1.15 mm.

"Substantially uniform thickness" means that the piece is designed to have a uniform thickness and that the product appears that way to a consumer. It is understood that a piece may have substantially uniform thickness even if there is an unavoidable thickening or thinning at a portion of the product. Likewise, in some instances described hereafter, it will be desired to emboss or engrave the thin edible pieces with a design. Such pieces nevertheless are considered to have a substantially uniform thickness.

Another important aspect of the invention is the formation of three-dimensionally contoured pieces. As used herein, a piece is "contoured" if it bends into the plane perpendicular to the thickness dimension, i.e., the piece bends in three dimensions, as compared to a tablet or a slab. The piece may be curved with respect to a single axis, or it may have a surface with multiple curves, formed with respect to multiple axes.

The "thickness" of an edible piece, as used herein, means the smallest dimension of the edible piece, which is generally a direction perpendicular to the surface on which the edible piece is formed, such as the second continuous belt. In ordinary parlance, length is the longest dimension of an article, and width is the second longest dimension. However, in the present context, it is sometimes necessary to define the "length" of a piece with respect to the transport on the belt or over the gap between two belts. In this context, when an edible piece is transported on a belt, the "length" of the edible piece means the dimension of the piece in a direction of travel on the belt, and "width," means the dimension of a piece in a direction perpendicular to the direction of travel of the piece, notwithstanding the relative magnitude of these dimensions in the particular case.

The invention has particular application to the manufacture of very thin chocolate or chocolate-like pieces. As used herein, the term "chocolate" refers to all chocolate or chocolate-like compositions with a fat phase or fat-like composition such that the composition can be processed according to the methods and with the apparatus described herein. The term refers, for example, to chocolates with compositions that conform to the U.S. Standards Of Identity ("SOI chocolate"), and compositions that do not conform to the U.S. Standards Of Identity ("non-SOI chocolate"). The standards of identity for different kinds of chocolate are found in Title 21, Part 163 of the Code of Federal Regulations, herein incorporated by reference. "Pure SOI chocolate," as that term is used herein, is chocolate that meets the Standards Of Identity for chocolate, and that is further substantially free of corn syrups or other carbohydrate syrups used as an extender. Non-SOI chocolates include those in which at least one of the standard ingredients of chocolate (i.e., one or more of the nutritive carbohydrate sweetener, the cocoa butter, and the milk fat) are replaced partially or completely, those in which components that have flavors that imitate milk, butter, or chocolate are added, and those in which other additions or deletions in the formulation are made that are outside FDA standards of identity of chocolate.

As used herein, the term "chocolate" includes dark chocolate, baking chocolate, milk chocolate, sweet chocolate, semi-sweet chocolate, buttermilk chocolate, skim milk chocolate, mixed dairy product chocolate, low fat chocolate, white chocolate, aerated chocolates, compound coatings, and chocolate-like compositions, unless specifically identified otherwise. "Chocolate" also includes crumb solids or solids fully or partially made by a crumb process.

A detailed description of the invention follows with specific reference to the figures. As shown in FIG. 1, first continuous belt 10 is provided with at least one cutout 12. In FIG. 1, the first belt is shown having several lanes of cutouts having the same profile. However, it is not necessary that the cutouts have the same profile, nor is it necessary that there be a plurality of lanes, or that there be a plurality of cutouts in each lane. The cutout 12 is superposed on the second continuous belt 14, which forms the bottom of the fill cavity 16. A detail of the fill cavity is shown in FIG. 2. The thickness of the first continuous belt 10, which is also approximately the thickness of the fill cavity 16, and of the edible blank formed therein, is preferably in a range of about 0.25 mm to about 5 mm, more preferably in a range of about 0.5 mm to about 3 mm, and most preferably less than about 2 mm. As shown in the detail of FIG. 2, walls 28 of the fill cavity 16 are cut from the first continuous belt 10. The cavity walls 28 may be straight and should be free of intrusions into the fill cavity 16, such as from fibers and the like. Thus, the first continuous belt 10 is preferably made of a polymeric material, metal or a combination thereof which is not fibrous. Polyurethane is one preferred material for the first continuous belt because it cuts cleanly.

The second continuous belt 14 is preferably formed from a highly flexible material having a high thermal conductivity, such that the temperature of the surface of the belt in contact with the edible blank changes rapidly as the belt moves from thermal contact with the heater or the cooler. Most preferably, the belt is a thin belt of TEFLON® (polytetrafluoroethylene) coated KEVLAR® (a para-aramid fiber, where the para-aramid fiber comprises oriented molecular chains of poly-par-aphenylene terephthalamide, having inter-chain bonding), or other material with similar performance characteristics that is approved for contact with food. Generally, the thickness required for the conveyor belt is determined by the length of the belt path and the speed of the belt along the path, which, in part, determine the required tensile strength of the belt. Preferably, the belt has a thickness of from about 0.008 inch (0.20 mm) to about 0.03 inch (0.76 mm), more preferably from about 0.01 inch (0.25 mm) to about 0.025 inch (0.635 mm), and, most preferably, from about 0.011 inch (0.25 mm) to about 0.02 inch (0.50 mm). A particularly useful belt for use with a belt forming apparatus has a thickness of from about 0.012 inch (0.30 mm) to about 0.015 inch (0.38 mm). The thermal conductivity of the conveyor belt is preferably from about 130 watts/meter·K to about 160 watts/meter·K, more preferably from about 140 watts/meter·K to about 155 watts/meter·K, and, most preferably, from about 145 watts/meter·K to about 150 watts/meter·K.

Depositor 18 is used to deposit an edible mass in the fill cavity 16. The type of edible mass is not particularly limited provided that it can be made to flow such that the fill cavity is evenly filled. The edible mass must also have a substantial change in viscosity over a usable temperature range. Table 1 below sets forth temperature ranges at which certain edible materials attain fluid, plastic and solid states, and a temperature and period of time for which they must be contacted to achieve a transition from one state to the other. The preferred edible mass is a chocolate or chocolate-like product, however, the process and apparatus described herein may also be used effectively with caramel, fudge, cookie dough, ice cream, pet food, sugar syrup, gels, pectin, pastry dough, pasta dough and batter.

TABLE 1

| Material | FLUID Temperature range for this state. | PLASTIC Temperature range for this state | SOLID | | | | |
|---|---|---|---|---|---|---|---|
| | | | Contact surface temperature to change to this state from fluid | Time in contact with surface to change state | Temperature range for this state | Contact surface temperature to change to this state from plastic | Time in contact with surface to change state |
| Chocolate Compound | >26 deg C. | 15-18 deg C. | 10 to 15 C. | <5 sec | <20 deg C. | 14 to 18 C. | 0 to 15 sec |
| Coating | >21 deg C. | 16 to 23 deg C. | 10 to 13 C. | <5 sec | <25 deg C. | 14 to 21 C. | 0 to 15 sec |
| Caramel | >30 deg C. | 0 to 30 deg C. | −5 C. | <15 sec | 0-30 | −5 deg C. | 5 sec |
| ice cream pet food | >−3 deg C. | −3 to −13 deg C. | −34 deg C. | >2 min | <−20 deg C. | −101 deg C. | 8 sec |

TABLE 1-continued

| Material | FLUID Temperature range for this state. | PLASTIC Temperature range for this state | SOLID Contact surface temperature to change to this state from fluid | Time in contact with surface to change state | Temperature range for this state | Contact surface temperature to change to this state from plastic | Time in contact with surface to change state |
|---|---|---|---|---|---|---|---|
| ("bone") | not applicable | 180-280 C. | 200-300 C. | 30-600 s | <120 C. | 5 to 100 C. | 30-600 s |
| sugar syrup | 120-170 deg C. | 35-100 deg C. | 35 deg C. | 10 min | 20-35 deg C. | 15-25 deg C. | 1-5 min |
| gels | 80-170 deg C. | >90 deg C. | 30-45 deg C. | 2-24 hours | 0-50 deg C. | 0-50 deg C. | 1-48 hours |
| pectin | >95 deg C. | 20-95 deg C. | pH setting - NA | pH setting - NA | pH setting - NA | pH setting - NA | pH setting - NA |

Figure 2A:
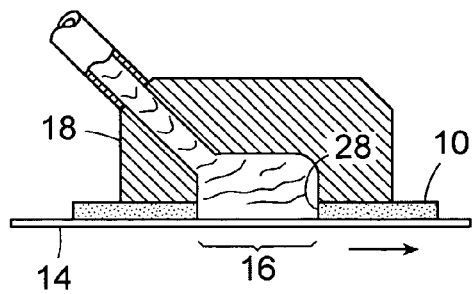
FIG. 2a is a detail of an apparatus according to the invention showing an embodiment of a depositor and fill cavity.
Figure 2B:
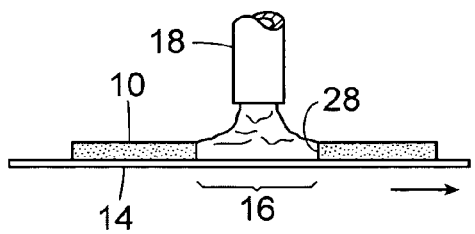
FIG. 2b is a detail of an apparatus according to the invention showing another embodiment of a depositor and fill cavity.

Depositor 18 may be a static depositor, which is essentially a dead-head pipe containing no moving parts, as shown in FIG. 2a, wherein the flow of edible mass is defined by the pressure and the cavity volume. Alternatively, a dynamic depositor may be used, having a piston or similar moving parts to deposit a predetermined amount of edible mass into each fill cavity as shown in FIG. 2b. The particular details of the depositor adapted to deposit a predetermined amount of edible mass are not shown in FIG. 2b, as the details of these elements are not critical, and would be known to those of ordinary skill in the art.

In the state that the edible mass is deposited in the fill cavity 16, it is referred to as an "edible mass." After the edible mass conforms to the outline of the cutout in the first continuous belt, it is referred to as an "edible blank." Once the edible blank has solidified somewhat, i.e., so that it is no longer fluid but is in a malleable state, it may still be called an edible blank, but is more specifically referred to as a "conditioned edible blank". Subsequent processing to impart a contoured surface results in the formation of a "contoured edible piece." The term "edible piece" is understood broadly, and includes both the edible blanks prior to further process steps being performed on them, and the subsequently formed contoured edible pieces. This terminology is used throughout the following process description.

At a first position 21 on the belt path, the edible mass flows to fill the fill cavity 16 and form an edible blank 15 having a substantially uniform thickness (i.e., the thickness of the belt). In some cases it may be desirable to warm the edible mass, either by warming the surrounding atmosphere, or by warming the belt, for example with a heating element 23, so that the temperature of the edible mass is in a range of about 25° C. to about 32° C. In this range, the chocolate will remain flowable and also retain its temper. A vibrator (not shown) may be used, for example, under the belt, to help the edible mass to evenly fill the fill cavity 16.

The atmosphere proximate the belts and the edible blanks, and contacting the entire apparatus, should have a dew point temperature less than the temperature of the equipment and the edible blanks to prevent condensation. Ambient temperature control, including heaters, coolers, humidifiers and dehumidifiers capable of maintaining the dew point temperature at the appropriate level are known to those of ordinary skill in the art.

The first and second belt (10, 14) are moved together with the edible blank to a second position 20, where the second belt separates from the first belt. After the edible mass is deposited, and before the belts separate, the edible mass must be cooled so that it at least partially sets. This may be done with a cooling element 22 in contact with the underside of the second belt 14, for example, a cooling plate having conduits through which a coolant can be circulated. The edible blank may be retained on the second belt at second position 20, as in FIG. 1, or may be retained in the cutout of the first continuous belt and may be released from the cutout by a removal member 24 (as shown schematically in FIG. 3). Removal member 24 may be used to position the edible blank on a rigid member such as die 25. Forming of a three dimensional piece may be done at the point where the blank is removed from the cutout, with removal member 24 and die 25 together constituting a forming station where the edible blank is contoured.

Alternatively, returning to FIG. 1, the edible blank may be adhered on the second continuous belt after the first continuous belt separates from the second continuous belt, at the second position in the belt path 20. At this point, the edible blanks are conditioned by cooling, for example, with a cooling element 56 in contact with the underside of the second belt 14, to ensure that the edible blanks transition from a fluid to a semisolid state. Representative temperatures for different starting materials are set forth in Table 1. Such conditioning may be in addition to the cooling required to set the product before the belts separate.

The second continuous belt abruptly changes direction at bull nose 26, and the edible blank is released from the second continuous belt by passing the second continuous belt over the bull nose 26, and the blank is transferred to pick-up belt 30.

The bull nose 26 provides a radius of curvature to the belt path of the second continuous belt that is sufficiently small that the edible blank is released from the conveyor belt as the conveyor belt passes over the bull nose. Typically, the belt path has a change of direction of at least about 90 degrees at the bull nose, preferably, at least about 135 degrees. Most preferably, the belt path has a change of direction of from about 135 degrees to about 150 degrees at the bull nose. The bull nose preferably has a radius of from about 0.125 inch (3.18 mm) to about 1 inch (25.4 mm), although the bull nose may have any radius that is sufficiently small to allow chocolate on the belt to separate from the belt as the belt passes around the bull nose. The belt path of the second continuous belt no longer coincides with the belt path of the first continuous belt after the second position on the belt path where the two belts separate from one another.

Typically the bull nose comprises a roller, but a "knife edge" type of bull nose is also known in the art. In any case, the bull nose provides a change of direction which is effective to release the edible blank from the second continuous belt 14 and allow transfer to pick-up belt 30. In general, the second continuous belt will travel in a first direction approaching the bull nose, and a second direction moving away from the bull nose, and the radius of curvature is measured over the change in direction between the first direction and the second direction. In this context, the "length" of the product is in the direction of travel of the belt. In the typical case where the bull nose is a roller, the radius of curvature will simply be the radius of the roller that the belt travels over to change direction. Generally, the ratio of the bull nose radius of curvature to the length of the edible blanks is less than 2:1 and greater than 0.1:1, preferably greater than 0.3:1. Preferably, the ratio is in a range between 1:1 and 0.5:1. For relatively smaller pieces a sharper bull nose is required to effectively separate the piece from the belt. However, at the low end of piece size and bull nose radius, wear and maintenance of the belt are factors that must be considered. Another consideration is the size of the gap between the point where the belt changes direction over the bull nose 26, and the pick-up belt 30 onto which the edible blanks may be transferred. The gap must be smaller than the length of the piece, and therefore the size of the bull nose 26 and the change of direction must also accommodate positioning the pick-up belt 30.

Figure 4:
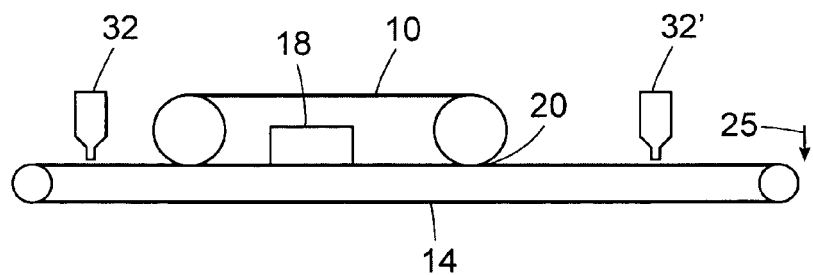
FIG. 4 shows an embodiment of a belt forming apparatus wherein an edible decoration is transferred to the edible mass or formed edible blank.

In an embodiment shown in FIG. 4, a decoration is applied to the edible mass or edible blank by a transfer method. Before depositing the edible mass in the fill cavity, an edible ink or dye is deposited as an image on the second continuous belt 14 from printer 32. Preferably, the image is applied before the first belt and the second belt come together. Printer 32 may be a continuous or drop-on-demand ink jet printer, or alternatively, a pad or gravure printing process can be used. If the edible mass is chocolate, preferably the edible ink or dye is a fat-based system such as a cocoa butter based system, so that it is compatible with the chocolate. The image is adhered to the edible mass when the edible mass is deposited in the fill cavity. A printing device can also be located after the formation of the edible blank. This location 32' allows the image to be placed on the top surface of the formed edible blank. This is a preferred location due to the possible distortion of the continuous belt after the image is printed on the belt surface, but prior to the depositing of the chocolate mass into the fill cavity.

A portion of the second continuous belt forming the bottom of the fill cavity may in some instances comprise a raised portion or a depressed portion adapted to create a corresponding embossed or engraved pattern in the edible blank and in the finished piece.

The forming methods and apparatus shall be described in connection with a process of making edible blanks using the belt forming methods and apparatus described above. However, it is understood that the forming methods and apparatus have a distinct mode of operation and separate utility and that they may be used separately. The process of imparting a three dimensional contour to the flat edible blanks according to the invention requires the steps of conveying the blanks on a conveyor belt, conditioning the blanks to a temperature and consistency so that they can be formed properly, contacting the blanks with a forming surface to impart contour, supporting the blanks on the forming surface, and removing the contoured edible pieces from the forming surface. These steps need not be conducted in order, in that conditioning may be conducted while the edible blanks are conveyed or while they are on the forming surface.

Figure 3:
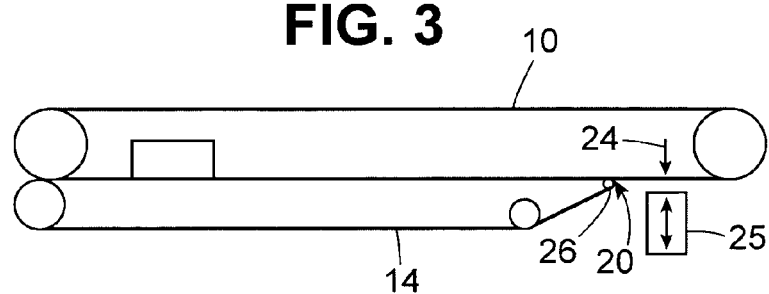
FIG. 3 depicts an embodiment of a belt forming apparatus showing a removal member to remove an edible blank from the cutout in the first continuous belt.

In all cases, the edible blanks must be conditioned before they can be contoured. This is the case whether the blanks are adhered onto the second continuous belt 14 as shown in FIG. 1, or retained in the cutout 12 in the first continuous belt 10, as shown in FIG. 3, or obtained independently. Conditioning involves inducing a phase change or change in viscosity in the edible blank to put the edible blank in a malleable state. As shown in FIG. 1, this may be done by permitting thermal contact between cooling element 56 and second continuous belt 14. Alternatively, the conveyor belt (which need not be the same as second continuous belt 14) may be passed through a cooling tunnel or other cooling zone on the belt path. If the blanks are to be retained in the cutout 12 in the first continuous belt 10, sufficient cooling needs to be applied before the first and second continuous belts separate at position 20 to provide sufficient structural integrity to maintain the blank in the cutout 12. For example, cooling element 22 could provide the necessary cooling. The blank is preferably cooled to a temperature in a range of about 10° C. to about 20° C., more preferably in a range of about 11° C. to about 18° C. For a chocolate piece, it has been found that the flexibility of the blank is optimized for subsequent shaping operations if the blank obtains a temperature in a range of about 12° C. to about 16° C. A fluid bath (not shown) may be used to maintain the temperature of the cooling element 56. A fluid temperature of 8.5° C. has been found to be sufficient for this purpose. The foregoing values for operating temperature are approximate and only generally applicable for chocolate and chocolate-like compositions. These may vary depending on the edible starting material used and if the material is chocolate, on the desired crystallization of the chocolate, which in turn depends on the particular recipe used. These values may differ altogether for a different edible mass.

Two particularly preferred embodiments of the forming station are the forming roller station and the linear die stamping station. In a linear die stamping station, as shown in part of FIG. 1, forming may be conducted by transferring the conditioned edible blank from a conveyor belt onto a first die 58, and pressing the blank between the first die 58 and second rigid die 60. This is referred to herein as "linear die stamping." Transfer from the conveyor belt may be accomplished utilizing a robotic transfer arm 46. In addition to the cooling required to partially solidify the edible blanks after they are formed in the fill cavity and after the first and second belts separate, it is helpful in many instances to further heat or cool the conditioned edible blank in a secondary heating or cooling step. Secondary heating or cooling may be conducted on a belt on which the conditioned edible blank is conveyed to the first die, or after the conditioned edible blank has been transferred to the first die 58. Alternatively, the first die may be transported through a heating zone 66 before reaching a forming station 68. Generally such heating involves gentle warming so that the conditioned edible blank can be more easily formed.

A preferred embodiment of the invention comprises a plurality of dies 58 which are transported on transport path 70. As shown in FIG. 1, robotic transfer arm 46 transfers an edible blank from conveyor belt 30 to the forming surface 59 of a first die 58. The dies 58 are then transported to a forming station 68. The die transport path may include a heating zone 66 before die forming station 68. The configuration of the die transport path is not limited to that shown in FIG. 1; a lazy-Susan, drum or shuttle arrangement could also be used, as would be appreciated by those having ordinary skill in the art.

The first and second die preferably have a polymeric forming surface 59 having a Shore A durometer hardness in a range of about 40 to about 80, preferably in a range of about 50 to about 70 and most preferably about 60. The forming surface 59 of the first die 58 is contoured to correspond to a desired contour of the contoured edible piece. The first and second die have complementary contoured surfaces adapted to approach each other to a distance approximately equal to the desired thickness of the contoured edible piece, to press the edible blank between them and form the contoured edible piece. The dies do not displace the chocolate in the thickness direction. Cooling and/or heating elements (not shown) may be provided to maintain the forming surface at a desired temperature; in embodiments the forming surface will be maintained in a range of about −25° C. to about 15° C.

Figure 5:
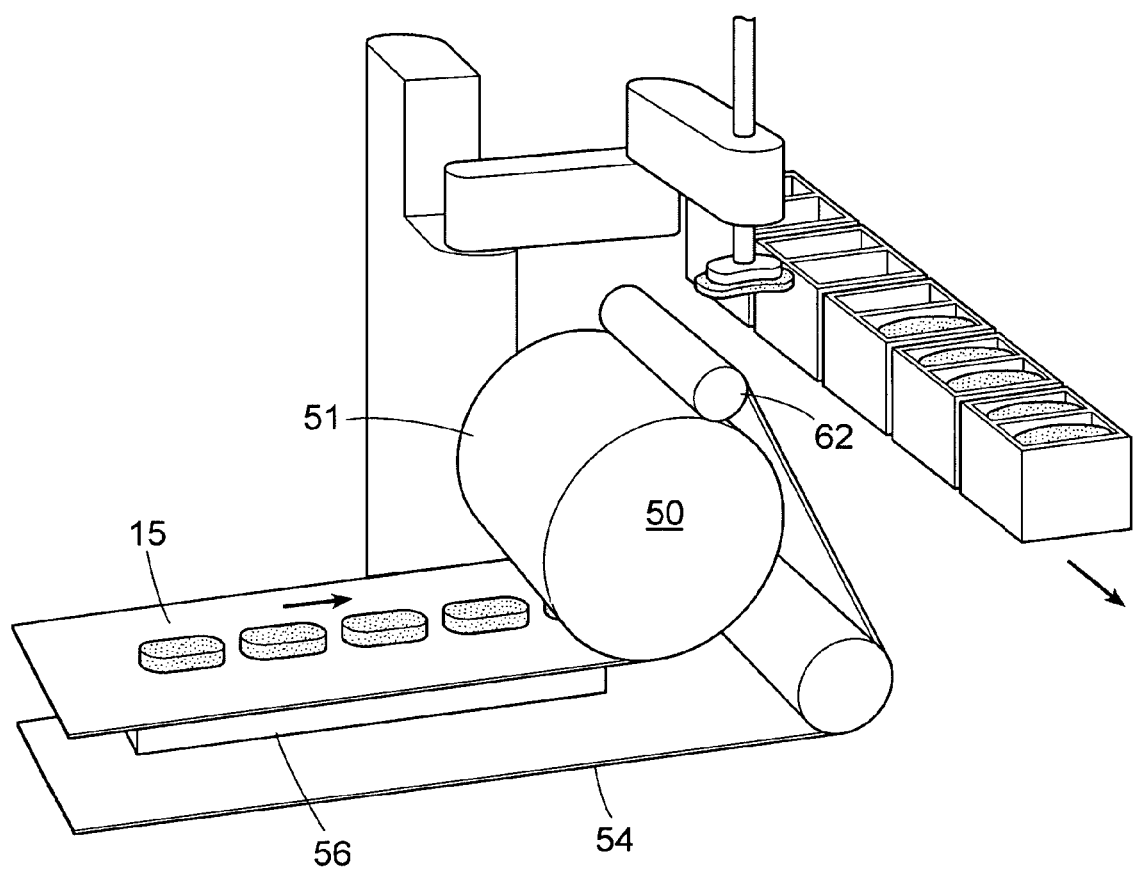
FIG. 5 is a view of a roll forming apparatus according to the invention.

Robotic pick-off arm 86 removes the contoured edible pieces from the forming surfaces 59 of the dies 58. The finished contoured edible pieces are transported away from the apparatus in conveying bins 71 on path 72.

Where the forming station is a roll forming station, the step of contacting an edible blank to impart contour may be conducted by contacting the edible blank with a rotating forming drum 50. As shown in FIG. 5, conditioned edible blanks 15 are conveyed on conveyor belt 54. Belt 54 may be the same belt as second continuous belt 14, but this is not required. Conditioned edible blanks 15 are flat edible pieces having uniform thickness which are solid enough that they hold their contour on the belt, but sufficiently malleable that they can be contoured by the forming drum 50. Backing roller 62 holds conveyor belt 54 against the forming drum 50, and the edible blank 15 is held between the conveyor belt 54 and the forming surface 51 of the forming drum 50 for a portion of the rotation of the forming drum 50.

Forming surface 51 may be contoured in the desired shape of the contoured edible piece. Preferably conduits (not shown) circulate coolant to and from the forming drum 50 effective to maintain the temperature of the forming surface in a range of about −25° C. to about 15° C. Contact of the conditioned edible blank with the rotating forming drum 50 is generally long enough that the conditioned edible blank 15 will retain the contour imparted by the forming surface. For example, the drum may contact the conditioned edible blank for a period of about 2 to about 5 seconds. The surface temperature of the chocolate in contact with the forming surface upon being removed from the forming surface is preferably 15° C. to 16° C.

Figure 6A:
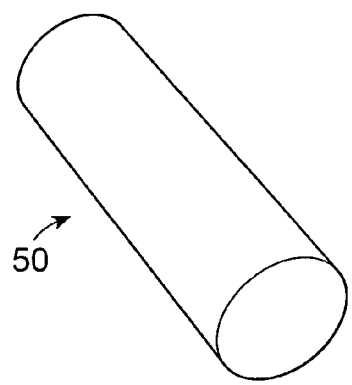
FIG. 6a, FIG. 6b and FIG. 6c are different possible profiles of a forming drum showing different variations in the forming surface.
Figure 6B:
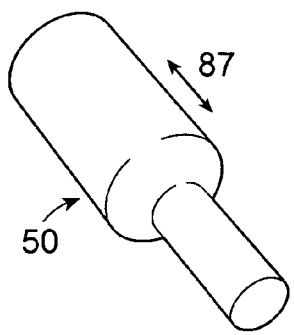
Figure 6C:
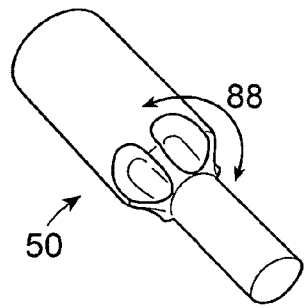

The forming drum has a generally cylindrical shape, wherein a portion of the radial surface thereof is a forming surface that imparts a three-dimensional contour to the edible blank. Thus, if the drum is a simple cylinder rotating on an axis, and each point on the forming surface is about the same distance from the axis of the drum, the contour imparted to the contoured edible piece is a like curve with respect to the axis of the drum, and this curvature is specified by the diameter of the drum. However, more complex contours may be generated by varying the distance of the forming surface to the axis of the drum at different points and the forming surface may be further contoured to create more complex contours. For example, the distance from the forming surface to the axis of the drum may vary in a direction 87 parallel to the axis of the drum as shown in FIG. 6b. Likewise, as shown in FIG. 6c, the radial surface may be provided with variation in a circumferential direction 88. Reference to the generally cylindrical shape of the forming drum includes shapes having oval and ovoid profiles as in FIG. 6a. It will be clear that the contour on the forming surface of the drum does not affect the generally cylindrical shape.

EXAMPLE

Dove Milk Chocolates, a commercially available milk chocolate, was melted and tempered in a Sollich Mini Tempering System TFD 150. The chocolate was cooled from 45° C. to 28° C. to produce cocoa butter crystals of stable and unstable polymorphs. The tempered chocolate was then warmed slightly to 31° C. to melt out unstable crystals. The tempered chocolate was held at 31° C. and had a temper level of 6 CTU (° F.) and 0.5 slope as determined by Tricor Tempermeter Model 501.

A urethane belt material (1.5 mm thick) with a rose petal pattern cut out (41 mm, major axis×31 mm, minor axis) was used in conjunction with a segment of a second belt material (white polyurethane). The two belts were sandwiched together to lay flat such that an open cavity was formed. Approximately 10 cm³ of chocolate, having a temperature of 28-30° C. was poured into the open cavity formed by the top urethane belt. The chocolate was spread and leveled using a putty knife held at 30' off the horizontal. The urethane template was removed, leaving a flat chocolate blank as an oval pattern (to form a rose petal profile). Promptly after removal of the template the chocolate formed on the white polyurethane belt was vibrated for approximately 2 seconds using a low amplitude, high frequency device (FMC Syntron Jogger Model J-50). This vibration step rounded the edges to give a more uniform piece. The belt segment with the chocolate blank was placed into a Sollich cooling tunnel Type MK280. The tunnel was set up with internal conditions of approximately 20° C., 10 cfm air velocity. The chocolate blank was conditioned under these conditions for approximately 2.5 minutes. The belt/chocolate blank exited the tunnel and the belt was pulled over a 5-mm radius edged surface perpendicular to the chocolate blank. This separated the solidified (conditioned) chocolate blank from the belt. The chocolate blank was moved to a shaping station consisting of upper and lower dies. The dies were constructed of an FDA silicone rubber (60 Durometer, Shore A). Each die was contoured with a contoured surface reflecting the shape of a single rose petal. The chocolate blank was placed into the lower die. The upper die was slowly lowered to press the flat chocolate pattern (oval blank) into the shape reflected in the surfaces of the die set (contoured rose petal). The dies were held at a surface temperature of 13° C. The dies and contoured chocolate piece were held in this position for approximately 6 seconds. The moisture content of the edible piece was less than 1.00 percent. The contoured chocolate piece became stable and was transported to a packaging station.

Figure 7:
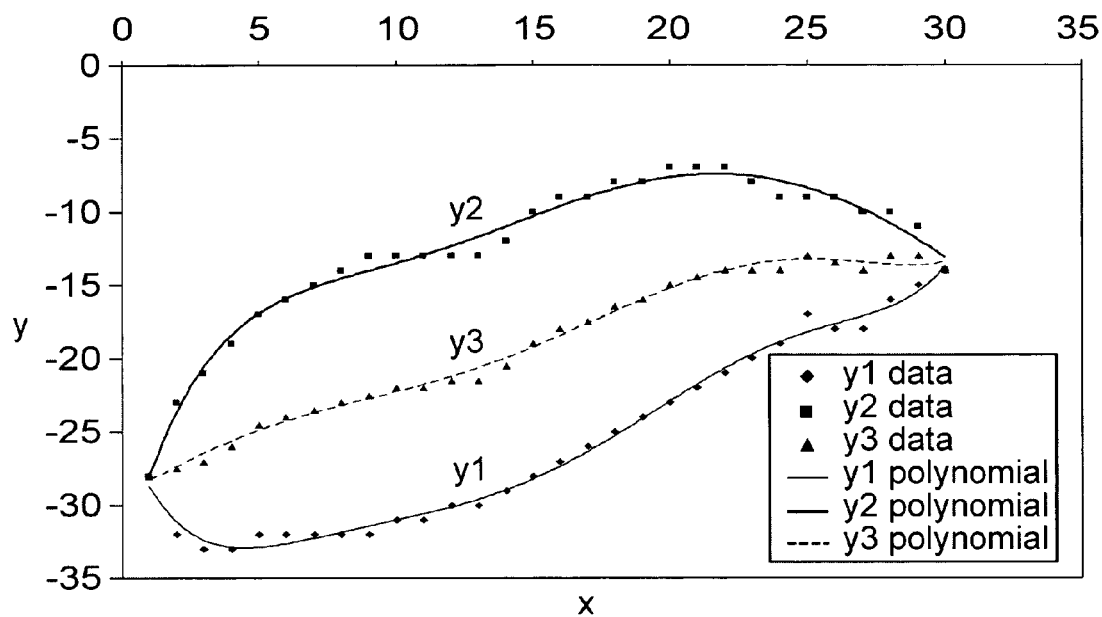
FIG. 7 is a mathematical modeling of the contoured shape of a chocolate product made according to the invention.
Figure 8:
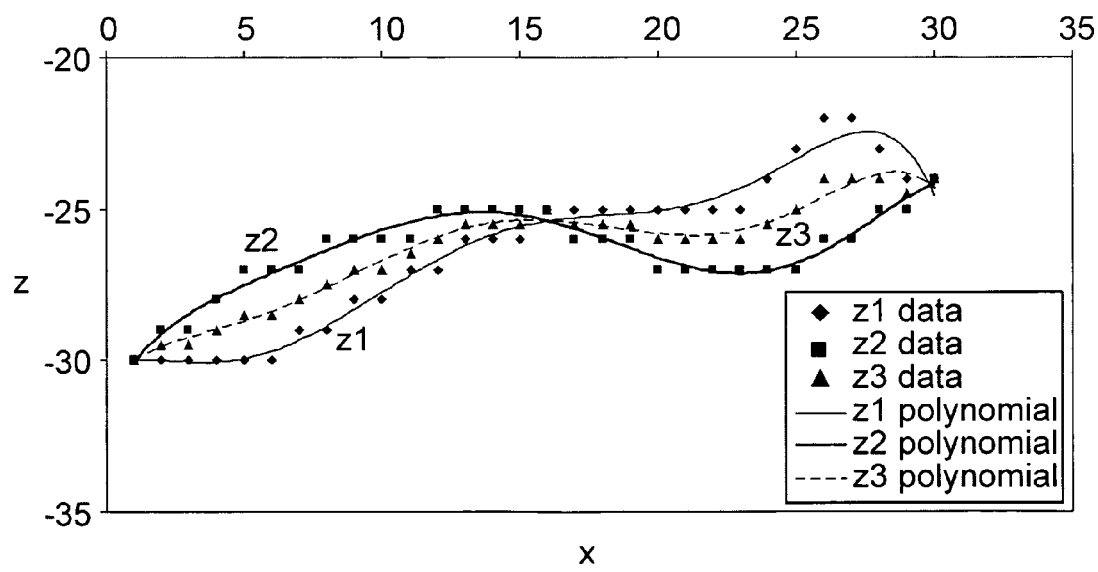
FIG. 8 is a mathematical modeling of the contoured shape of a chocolate product made according to the invention.

Edible products made according to the invention have varied surface contours. FIG. 7 and FIG. 8 depict how the complex three dimensional contours may be modeled mathematically. In one approach, separate sets of equations are used to relate y and z coordinates to x. Thus, to model the organic shape of a contoured leaf (where "organic" describes an irregular shape like those found in nature), the shape of the leaf in the x-y plane, as graphed in FIG. 7, may be defined by three equations referring to the leaf petal shape with the first and second equations (y1 and y2 as a function of x) defining the two edges of the piece, and the third (y3 as a function of x) defining a contour line roughly down the middle.

The three equations for the y coordinates as a function of x, where x varies between 0 and L, where L is equal to the length of the product, along with regression data.

$$y1 = 0.000002108067x^6 - 0.000199449936x^5 + 0.007270370913x^4 - 0.129584821630x^3 + 1.209739437447x^2 - 5.277970931901x - 24.489867365819 \quad [R2=0.9937]$$

$$y2 = -0.00000056102035x^6 + 0.000071679997404x^5 - 0.00358575427859x^4 + 0.08698817808531x^3 - 1.07422703903911x^2 + 7.01904281974441x - 33.99713527451100 \quad [R2=0.9848]$$

$$y3 = 0.00000077352x^6 - 0.00006388498x^5 + 0.00184230832x^4 - 0.02129832177x^3 + 0.06775619920x^2 + 0.87053594393x - 29.24350132017 \quad [R2=0.9935]$$

FIG. 8 graphically represents the shape of the leaf in the x-z plane. Three equations may be used with the first and second equations (z1 and z2 as a function of x) defining the two edges and the third (z3 as a function of x) defining the contour line running roughly down the middle of the product. The three equations for the z coordinates as a function of x, where x varies between 0 and L, and L is equal to the length of the piece, are shown below, along with regression data.

$$z1 = -0.0000013699x^6 + 0.0001135834x^5 - 0.0034277567x^4 + 0.0445869705x^3 - 0.2159520665x^2 + 0.3737026822x - 30.1826112457 \quad [R2=0.9775]$$

$$z2 = -0.00000089237x^6 + 0.00007996098x^5 - 0.00263083874x^4 + 0.03992789295x^3 - 0.31227790068x^2 + 1.62356002215x - 31.41230178491 \quad [R2=0.9560]$$

$$z3 = -0.0000011312x^6 + 0.0000967722x^5 - 0.0030292977x^4 + 0.0422574317x^3 - 0.2641149836x^2 + 0.9986313522x - 30.7974565153 \quad [R2=0.9810]$$

In the foregoing example, two sets of sixth order polynomial equations were used to define the outlines of the contoured product and the roughly 'center-line' of the product in the x-y and x-z planes, respectively. The equations fit well to the lines as evidenced by the high regression calculation results (all better than 0.95). It is preferred to use more than three equations to define the product contours in each plane. It is also preferred to use sets of polynomial equations that are greater than third order in the x variable to define the y and z coordinates. The more complex the contours of the product, the higher the order of the equations should be to properly define the contoured piece. Equations that are fifth or higher order in the x variable are preferred, seventh or higher order are more preferred, and it is most preferred to use tenth or higher order to characterize a contoured piece according to the invention.

Thus, in a general model, the contoured shape of the chocolate product can be defined in three-dimensional space by sets of polynomial equations of the form $$y_k = a_{k,0} + a_{k,1}x + a_{k,2}x^2 + \ldots + a_{k,n}x^n$$

$$z_k = b_{k,0} + b_{k,1}x + b_{k,2}x^2 + \ldots + b_{k,n}x^n$$

where x varies between 0 and L where L equals the length of the contoured chocolate product.

In preferred embodiments, at least $a_2$ and the $x^2$ term in the equation for y above is not zero. Alternatively, at least $b_2$ and the $x^2$ term in the equation for z above is not zero. In preferred embodiments, both the $a_2$ term and the $b_2$ term and the corresponding $x^2$ terms in both equations are not zero. Still more preferably, the equations for y and z above contain third order or higher terms which are not zero.

In the above general model, at least two equations are used to define the contoured shape in terms of x and y, having the form $$y_1 = a_{1,0} + a_{1,1}x + a_{1,2}x^2 + \ldots + a_{1,n}x^n$$

$$y_2 = a_{2,0} + a_{2,1}x + a_{2,2}x^2 + \ldots + a_{2,n}x^n$$

Preferably, at least one of $a_{1,2}$ and $a_{2,2}$ and the $x^2$ terms in the equations for $y_1$, $y_2$, etc., above are not zero. In preferred embodiments, all of the second order terms for $y_1$, $y_2$, etc., are not zero. More preferably, the equations for $y_1$, $y_2$, etc., above contain third order or higher terms which are not zero.

In the above general model, at least two equations are used to define the contoured shape in terms of x and z, and the equations are of the form $$z_1 = b_{1,0} + b_{1,1}x + b_{1,2}x^2 + \ldots + b_{1,n}x^n$$

$$z_2 = b_{2,0} + b_{2,1}x + b_{2,2}x^2 + \ldots + b_{2,n}x^n$$

Preferably, at least one of $b_{1,2}$ and $b_{2,2}$ and the $x^2$ terms in the equations for z above are not zero. In preferred embodiments, all of the second order terms for $z_1$, $z_2$, etc., are not zero. More preferably, the equations for z above contain third order or higher terms which are not zero.

In a different model, the contoured shape can be defined in three dimensional space by a polynomial equation of the form $$z = a_0 + a_{1,0}x + a_{0,1}y + a_{1,1}xy + a_{2,1}x^2y + a_{1,2}xy^2 + a_{2,2}x^2y^2 + \ldots + a_{n,m}x^n y^m$$

where x varies between 0 and L, where L is equal to the length of the product and y varies between f1(x) and f2(x), where f1 is a function that describes the dependence between y and x for a first edge of the product, and f2 is a function that describes the dependence between y and x for a second edge of the surface.

In this case it is preferred that one of the $x^2y$, $xy^2$ or $x^2y^2$ terms is not zero. Preferably, all of the second order terms are not zero. Still more preferably, a contour defined by the invention has third order or higher terms which are not zero.

Whereas prior art molded chocolate products according to the prior art are limited to having a shape of a simple bend, the contoured chocolate product according to the invention may have two or more curves along a single axis of curvature (as in a wave form). Likewise, the product may have at least one curve along two axes of curvature (including certain quadric shapes, such as a saddle), or at least two curves along one axis of curvature and at least one curve along a second axis of curvature. Other models may be used to describe complex contours, including contours described by functions having discontinuities.

The foregoing description of the preferred embodiments shall not be considered to limit the invention, which is defined by the appended claims.

What is claimed is:

1. A method of forming an edible piece comprising the steps of:
   a) providing a first continuous belt moving on a first belt path and having at least one cutout through the entire thickness of the belt, which forms a through hole, and a second continuous belt moving with the first continuous belt, wherein a portion of the second continuous belt is positioned below the through hole in the first continuous belt at a first position on the first belt path so as to create a cavity having walls defined by the cutout through hole and a bottom formed by the second continuous belt;
   b) adding a fluid edible mass to the cavity at the first position on the first belt path to form an edible blank;
   c) transporting the cavity and the edible blank to a second position on the first belt path;
   d) cooling to set the edible blank to a semisolid state;
   e) separating the first continuous belt from the second continuous belt at the second position on the first belt path; and
   f) releasing the edible blank from the first or second continuous belt.

2. The method according to claim 1, comprising the steps of:
   retaining the edible blank in the cutout in the first continuous belt after separating the first continuous belt from the second continuous belt, and
   releasing the edible blank from the cutout in the first continuous belt by contacting the blank with a removal member.

3. The method according to claim 1, comprising the steps of:
   adhering the edible blank on the second continuous belt after separating the first continuous belt from the second continuous belt, and
   releasing the edible blank from the second continuous belt by passing the second continuous belt over a bull nose.

4. The method according to claim 1, further comprising the step of warming the edible mass in the cavity while the edible mass is being deposited.

5. The method according to claim 4, wherein the step of warming is conducted by applying heat to the second continuous belt with a heating element proximate to and in thermal contact with the second continuous belt.

6. The method according to claim 5, wherein the edible mass is chocolate, and said step of warming maintains a temperature of the chocolate in the cavity in the range of about 25°C. to about 32°C.

7. The method according to claim 1, further comprising the step of cooling the edible blank after the blank is released from the first or second continuous belt.

8. The method according to claim 7, wherein the step of cooling is conducted by contacting the second continuous belt with a cooling element having a temperature in the range of about 10° C. to about 20° C.

9. The method according to claim 1, further comprising the step of controlling temperature and/or humidity of an ambient atmosphere in an area proximate the belt path so that the dew point of the ambient atmosphere is less than the temperature of the edible blank and less than a surface temperature of the first and second continuous belts.

10. The method according to claim 1, wherein the thickness of the first continuous belt is about 1.00 mm to about 2.00 mm.

11. The method according to claim 1, wherein the thickness of the first continuous belt is about 1.00 mm to about 1.50 mm.

12. The method according to claim 1, wherein the edible mass is selected from the group consisting of chocolate, caramel, fudge, cookie dough, ice cream, pet food, sugar syrup, gels, pectin, pastry dough, pasta dough and batter.

13. The method according to claim 1, further comprising the step of transporting the edible blank to a forming station and contacting the edible blank with a rigid member to impart contour to the edible blank to form a contoured edible piece.

14. The method according to claim 13, wherein the rigid member is a forming drum adapted to impart a contour to the edible blank to form a contoured edible piece.

15. The method according to claim 14, further comprising the step of pressing the edible blank against the forming drum while the forming drum rotates to impart a contour to the edible blank to form a contoured edible piece.

16. The method according to claim 14, wherein the forming drum has a temperature of about −25° C. to about 15° C.

17. The method according to claim 1, wherein the portion of the second continuous belt forming the bottom of the cavity comprises at least one raised portion adapted to emboss a pattern in the edible blank.

18. The method according to claim 1, further comprising the step of depositing an edible decoration on the second continuous belt prior to depositing an edible mass in the cavity and adhering the decoration to the edible blank.

19. The method according to claim 1, wherein the edible mass is chocolate.

20. The method according to claim 13, wherein the contoured edible piece is decorated with an edible component subsequent to imparting contours at the forming station.

* * * * *

UNITED STATES PATENT AND TRADEMARK OFFICE
Certificate

Patent No. 7,820,218 B2                                              Patented: October 26, 2010

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: George Graham, Hackettstown, NJ (US).

Signed and Sealed this Twenty-fifth Day of December 2012.

<div align="right">
HUMERA N. SHEIKH<br>
*Supervisory Patent Examiner*<br>
Art Unit 1793<br>
Technology Center 1700
</div>